United States Patent
Choi et al.

(10) Patent No.: US 10,168,686 B2
(45) Date of Patent: Jan. 1, 2019

(54) SMART LOADER APPARATUS FOR TRUNK LID HINGE

(71) Applicant: HYUNDAI MOTOR COMPANY, Seoul (KR)

(72) Inventors: Chanwoo Choi, Pyeongtaek-si (KR); Jongchol Seo, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 221 days.

(21) Appl. No.: 15/209,175

(22) Filed: Jul. 13, 2016

(65) Prior Publication Data
US 2017/0168475 A1   Jun. 15, 2017

(30) Foreign Application Priority Data
Dec. 10, 2015   (KR) .................. 10-2015-0176345

(51) Int. Cl.
  *B25J 13/08*   (2006.01)
  *B62D 65/02*   (2006.01)
  (Continued)

(52) U.S. Cl.
CPC ............ *G05B 19/35* (2013.01); *B25J 13/085* (2013.01); *B25J 13/086* (2013.01); *B25J 19/06* (2013.01);
(Continued)

(58) Field of Classification Search
CPC .......... B25J 9/06; B25J 13/00; B25J 15/0028; B62D 65/02; B62D 65/06
See application file for complete search history.

(56) References Cited

U.S. PATENT DOCUMENTS 5,125,149 A * 6/1992 Inaba .................... B23P 19/001
  198/341.05
5,181,307 A * 1/1993 Kitahama ............... B62D 65/06
  29/11
(Continued)

FOREIGN PATENT DOCUMENTS

JP    H07-241790 A   9/1995
JP    2002-283276 A  10/2002
(Continued)

OTHER PUBLICATIONS

Bouchard, Samuel, 7 Types of Industrial Robot Sensors Robtiq.com, Sep. 30, 2014.*
(Continued)

*Primary Examiner* — Scott L Jarrett
(74) *Attorney, Agent, or Firm* — McDermott Will & Emery LLP (57) ABSTRACT

A smart loader apparatus for a trunk lid hinge includes a hinge alignment jig at which a trunk lid hinge is aligned and disposed at a predetermined position, a smart loader of which a transfer gripper for gripping the trunk lid hinge aligned at the hinge alignment jig is disposed at a front end portion, and the smart loader includes an articulated arm for transferring the trunk lid hinge gripped by the transfer gripper to a predetermined position of a vehicle body, a driving portion that drives the transfer gripper and the articulated arm to change a position of the transfer gripper, a force and torque (FT) sensor installed at a portion at which the articulated arm and the transfer gripper are connected, and a controller that controls the driving portion to move the transfer gripper in the direction of the force sensed by the FT sensor.

12 Claims, 8 Drawing Sheets

(51) Int. Cl.
B62D 65/06 (2006.01)
B25J 9/06 (2006.01)
B25J 13/00 (2006.01)
G05B 19/35 (2006.01)
G05B 15/02 (2006.01)
B25J 19/06 (2006.01)

(52) U.S. Cl.
CPC ......... *B62D 65/024* (2013.01); *B62D 65/026* (2013.01); *B62D 65/06* (2013.01); *G05B 15/02* (2013.01); *G05B 2219/2637* (2013.01); *G05B 2219/35191* (2013.01); *G05B 2219/42063* (2013.01)

(56) References Cited

U.S. PATENT DOCUMENTS

| | | | | |
|---|---|---|---|---|
| 5,266,877 A * | 11/1993 | Takahashi | ........ | G05B 19/40937 29/740 |
| 6,004,016 A * | 12/1999 | Spector | ........ | B25J 9/1666 700/247 |
| 6,069,463 A * | 5/2000 | Umeda | ........ | B25J 9/1641 318/568.22 |
| 6,279,724 B1 * | 8/2001 | Davis | ........ | H01L 21/67742 198/465.2 |
| 6,485,081 B1 * | 11/2002 | Bingle | ........ | E05B 83/26 292/DIG. 43 |
| 6,601,268 B2 * | 8/2003 | Seo | ........ | E05D 11/1057 16/334 |
| 7,331,094 B2 * | 2/2008 | Berninger | ........ | B23K 37/0435 269/37 |
| 7,836,584 B2 * | 11/2010 | Lim | ........ | B23P 19/06 29/787 |
| 8,073,568 B2 * | 12/2011 | Hsu | ........ | G05B 13/024 318/568.12 |
| 8,286,528 B2 * | 10/2012 | Fujioka | ........ | B25J 9/102 74/490.01 |
| 8,340,821 B2 * | 12/2012 | Ito | ........ | B25J 9/1671 700/245 |
| 8,356,403 B2 * | 1/2013 | Woo | ........ | B23P 21/004 228/212 |
| 8,442,686 B2 * | 5/2013 | Saito | ........ | B25J 9/06 700/245 |
| 8,457,787 B2 * | 6/2013 | Glißmann | ........ | B23Q 5/58 700/178 |
| 8,894,116 B2 * | 11/2014 | Kim | ........ | B25J 15/0028 294/104 |
| 9,095,984 B2 * | 8/2015 | Miyazaki | ........ | B25J 13/085 |
| 9,266,240 B2 * | 2/2016 | Shiraki | ........ | B25J 9/047 |
| 9,274,516 B2 * | 3/2016 | Maier | ........ | G05B 19/4062 |
| 9,592,611 B2 * | 3/2017 | Asamizu | ........ | B25J 15/0019 |
| 2002/0056181 A1 * | 5/2002 | Sakakibara | ........ | B25J 9/1633 29/407.01 |
| 2002/0150449 A1 * | 10/2002 | Nelson | ........ | H01L 21/67769 414/217.1 |
| 2004/0034984 A1 * | 2/2004 | Aoki | ........ | B62D 25/04 29/525.01 |
| 2004/0060150 A1 * | 4/2004 | Krozek | ........ | E05C 17/203 16/86 C |
| 2004/0078931 A1 * | 4/2004 | Krozek | ........ | E05C 17/203 16/303 |
| 2006/0071625 A1 * | 4/2006 | Nakata | ........ | B25J 9/1633 318/568.12 |
| 2006/0107507 A1 * | 5/2006 | Brose | ........ | B25J 9/1684 29/407.1 |
| 2008/0069679 A1 * | 3/2008 | Shimada | ........ | B25J 9/06 414/744.5 |
| 2008/0168639 A1 * | 7/2008 | Otake | ........ | B25J 5/02 29/56.6 |
| 2010/0145515 A1 * | 6/2010 | Nakanishi | ........ | B25J 9/1676 700/255 |
| 2011/0048651 A1 * | 3/2011 | Goth | ........ | E04F 10/0614 160/22 |
| 2014/0132019 A1 * | 5/2014 | Kim | ........ | B25J 15/0028 294/197 |
| 2014/0167342 A1 * | 6/2014 | Jin | ........ | B23P 21/00 269/27 |
| 2014/0290414 A1 * | 10/2014 | Hasuo | ........ | B25J 19/0012 74/490.01 |
| 2014/0297032 A1 * | 10/2014 | Hayashi | ........ | B25J 9/1674 700/245 |
| 2016/0001446 A1 * | 1/2016 | Caldas | ........ | B25J 9/1676 702/190 |
| 2016/0109229 A1 * | 4/2016 | Yeum | ........ | G01B 11/27 33/194 |
| 2016/0331134 A1 * | 11/2016 | Harrington | ........ | A47B 23/043 |
| 2017/0050314 A1 * | 2/2017 | Yoshida | ........ | B25J 9/06 |
| 2017/0314731 A1 * | 11/2017 | Glaser | ........ | A47B 21/03 |

FOREIGN PATENT DOCUMENTS

| | | |
|---|---|---|
| JP | 2010-269419 A | 12/2010 |
| JP | 2011-056646 A | 3/2011 |
| JP | 5146621 B2 | 2/2013 |
| KR | 10-2013-0015818 A | 2/2013 |
| KR | 10-1535159 B1 | 7/2015 |

OTHER PUBLICATIONS

Lee, Sang-Duck et al., Novel Collision Detection Index based on Joint Torque Sensors for Redundant Manipulator 2013 IEEE/RSJ International Conference on Intelligent Robot Systems (IROS), Nov. 3-7, 2013.*

Kinugawa, Jun et al., Collision Risk Reduction System for Assembly Task Robot 2012 IEEE?ASME International Conference on Advanced Intelligence Mechatronics, Jul. 11-14, 2012.*

Song, Jae-Bok, Collision Safety for Physical Human Robot Collaboration, IROS 2015 Workshhop,2015.*

Leng, Yu-Quan et al., Collision Sensing Using Force/Torque Sensor Jounral of Sensors, vol. 2016, 2016.*

Koga, Masanobu et al., Coordinated Motion Control of Robot Arms Based on Virtual Internal Model IEEE Transactions on Robotics and Automation, vol. 8, No. 1, Feb. 1992.*

Indri, Marina et al., A general procedure for collision detection between an industrial robot and the environment IEEE, 2015.*

Lu, Shujun et al., Human-Robot Collision Detection and Identification Based on Wrist and Base Force/Torque Sensors Proceedings of the 2005 International Conference on Robotics and Automation, Apr. 2005.*

Shaffer, Clifford A., Real-time Robot Arm Collision Detection for Telerobotics Computers Electrical Engineering, vol. 17, No. 3, 1991.*

* cited by examiner

FIG. 8 sensor may be disposed at a portion at which the first arm and the second arm are connected to each other.

SMART LOADER APPARATUS FOR TRUNK LID HINGE

CROSS-REFERENCE TO RELATED APPLICATION

This application claims the benefit of priority to Korean Patent Application No. 10-2015-0176345, filed with the Korean Intellectual Property Office on Dec. 10, 2015, the entire contents of which are incorporated herein by reference.

TECHNICAL FIELD

The present disclosure relates to a smart loader apparatus for a trunk lid hinge, and more particularly, to a smart loader apparatus for a trunk lid hinge that may transfer a trunk lid hinge to a predetermined position of a vehicle body and a worker may adjust a position of the trunk lid hinge with a small force through collaboration with the worker and a robot.

BACKGROUND

Due to techniques used in the industrial manufacturing field, simple and repetitive tasks, and difficult tasks, increase risks for musculoskeletal diseases. Thus, a collaboration robot which can assist a worker has emerged as an alternative for solving this problem.

A process for mounting a trunk lid hinge on a vehicle body requires a repetitive task, which may overburden a worker, thus a weight balance type of labor-saving apparatus may be used for reducing this problem.

However, since such a labor-saving apparatus may not be able to perform an accurate positional control, the work's burden increases during a process of fastening trunk lid hinges, and it is difficult to commonly apply the labor-saving apparatus to various kinds of vehicles.

Accordingly, a smart labor-saving apparatus and loader that both have the attention to detail of the worker and the robustness of a robot and that may be applied to the various kinds of vehicles has been researched, such that a labor burden and a workplace risk may be reduced.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a smart loader apparatus for a trunk lid hinge wherein a smart loader may collaborate with a worker to transfer a trunk lid hinge to an accurate position, stability thereof may be improved by stopping a working process when a collision occurs, and an workplace may be safely established by stopping an operation thereof when an object is sensed around an articulated arm.

An exemplary embodiment of the present disclosure provides a smart loader apparatus for a trunk lid hinge, that may include a hinge alignment jig at which a trunk lid hinge is aligned and disposed at a predetermined position; a smart loader of which a transfer gripper for gripping the trunk lid hinge aligned at the hinge alignment jig is disposed at a front end portion, and the smart loader includes an articulated arm for transferring the trunk lid hinge gripped by the transfer gripper to a predetermined position of a vehicle body; a driving portion that drives the transfer gripper and the articulated arm to change a position of the transfer gripper and allows the transfer gripper to grip or release the trunk lid hinge; a force and torque (FT) sensor installed at a portion at which the articulated arm and the transfer gripper are connected for sensing a direction of a force applied to the transfer gripper or the trunk lid hinge in an operational standby state of the articulated arm and the transfer gripper; and a controller that controls the driving portion to move the transfer gripper in the direction of the force sensed by the FT sensor.

The hinge alignment jig may include a moving frame disposed on a fixed frame to be movable along a guide; a first alignment gripper disposed on the moving frame to grip one side of the trunk lid hinge and a second alignment gripper disposed to grip another side of the trunk lid hinge; and a first cylinder for operating the first alignment gripper, a second cylinder for operating the second alignment gripper and a third cylinder disposed to move the moving frame along the guide on the fixed frame.

The smart loader may include a fixed body fixed on a floor; a vertically moving member disposed to be vertically movable along a rail from one side of the fixed body; and a gas spring that elastically upwardly supports the vertically moving member through a rod inserted into a gas cylinder in which a gas is filled at a predetermined pressure, wherein the transfer gripper is rotatably disposed at one end of the articulated arm, and another end of the articulated arm is rotatably disposed at the vertically moving member.

The smart loader apparatus for the trunk lid hinge may further include a proximity sensor disposed at one side of the articulated arm of the smart loader to sense an object within a predetermined distance region, wherein the controller controls the driving portion and stops an operation of the driving portion depending on a signal sensed by the proximity sensor.

The controller may control the driving portion in the direction of the force sensed by the FT sensor to correct a position of the transfer gripper through the articulated arm.

The transfer gripper may include a gripper body fixed to a front end portion of the articulated arm; a fixed finger fixed to one side of the gripper body; and a driving finger combined with the other side of the gripper body through a hinge, wherein the driving portion includes a gripper cylinder that rotates the driving finger based on the trunk lid hinge on the gripper body such that the fixed finger and the driving finger grip the trunk lid hinge.

A plurality of proximity sensors may be arranged at a predetermined interval in a length direction of the articulated arm to sense an object or a worker within a predetermined distance.

The driving portion may include a motor that outputs torque to control a position of the articulated arm, the controller may calculate a difference between an actual rotational position and a theoretical rotational position of the motor and determines whether a collision has occurred depending on a magnitude of the difference, and when it is determined that the collision has occurred, the controller may stop an operation of the driving portion to stop a movement of the articulated arm.

The articulated arm may include a first arm connected to the vertically moving member and disposed in a horizontal direction to be rotatable in the horizontal direction; and a second arm connected to the first arm and disposed in a horizontal direction to be rotatable in the horizontal direction based on the first arm, wherein the motor and a decelerator are disposed at a portion at which the vertically moving member and the first arm are connected and at a portion at which the first arm and the second arm are connected, and rotational positions of the first and second arms are changed by the motor and the decelerator.

Another exemplary embodiment of the present disclosure provides a control method of a smart loader apparatus, including: aligning a trunk lid hinge to be assembled at a vehicle body on a hinge alignment jig; gripping the trunk lid hinge aligned at the hinge alignment jig with a transfer gripper disposed at an end portion of an articulated arm and transferring the trunk lid hinge to a predetermined position of the vehicle body; sensing a direction of a force applied to the transfer gripper or the trunk lid hinge in an operational standby state of the articulated arm and the transfer gripper with a force and torque (FT) sensor installed between the articulated arm and the transfer gripper; and correcting a position of the transfer gripper in the direction of the force sensed by the FT sensor.

The method may further include aligning a position of the trunk lid hinge disposed at the hinge alignment jig with an alignment gripper that grips the trunk lid hinge disposed at the hinge alignment jig and a cylinder moving the alignment gripper.

The smart loader may include a fixed body fixed on a floor; a vertically moving member vertically movable along a rail from one side of the fixed body; and a gas spring that elastically upwardly supports the vertically moving member through a rod inserted into a gas cylinder in which a gas is filled at a predetermined pressure, wherein the transfer gripper is rotatably disposed at one end of the articulated arm, and another end of the articulated arm is rotatably disposed at the vertically moving member.

The method may further include sensing an object or a worker with a proximity sensor disposed at a predetermined position relative to the articulated arm of the smart loader; and stopping operations of the articulated arm and the transfer gripper when the object or the worker is sensed.

A motor outputting torque for driving the articulated arm may be included, and the control method may further comprise: calculating a difference between an actual rotational position and a theoretical rotational position of the motor; determining whether a collision has occurred depending on a magnitude of the difference; and stopping a movement of the articulated arm when it is determined that a collision has occurred.

According to an embodiment of the present disclosure, it is possible accurately control positions of an articulated arm and a hinge through an FT sensor and to collaborate with a worker, thus the musculoskeletal diseases of the worker may be prevented.

According to an embodiment of the present disclosure, a collision with an external object may be prevent by using a proximity sensor using an ultrasonic wave while a hinge is transferred, and when a collision occurs, since an operation of an articulated arm may be stopped, thereby improving safety thereof.

Further, the smart loader apparatus for the trunk lid hinge according to an embodiment of the present disclosure may be commonly applied to various kinds of vehicles by arranging hinges for the various kinds of vehicles at a hinge alignment jig and then by selectively transferring a corresponding hinge according to a kind of vehicle.

DETAILED DESCRIPTION

An exemplary embodiment of the present disclosure will hereinafter be described in detail with reference to the accompanying drawings.

Figure 1:
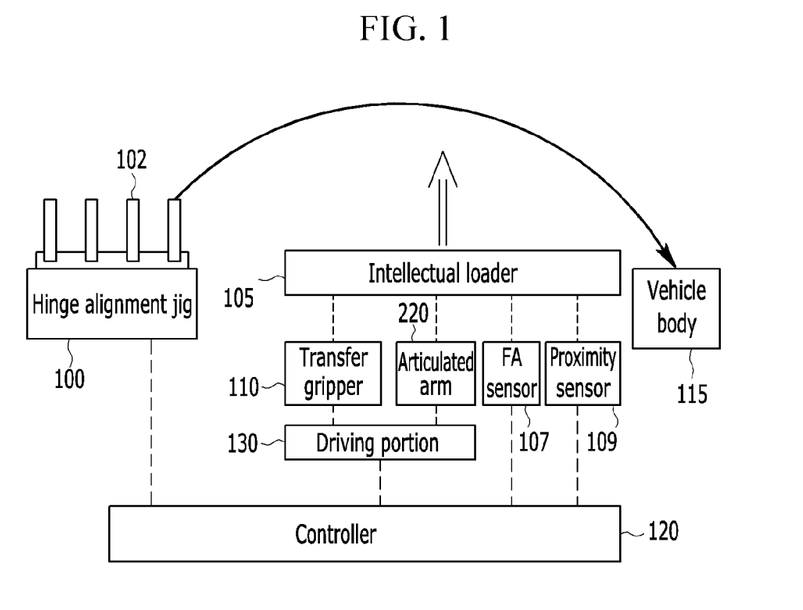
FIG. 1 illustrates a schematic diagram of a smart loader apparatus for a trunk lid hinge according to an exemplary embodiment of the present disclosure.

Referring to FIG. 1, a smart loader apparatus for a trunk lid hinge according to an exemplary embodiment of the present disclosure may include a hinge alignment jig 100, a smart loader 105, a vehicle body 115 and a controller 120, wherein the smart loader 105 may include a transfer gripper 110, an articulated arm 220, a driving portion 130, an FT sensor 107 and a proximity sensor 109.

A worker may dispose the trunk lid hinge 102 (hereinafter, referred to as a "hinge") at the hinge alignment jig 100, and the worker may align the hinges 102 disposed at the hinge alignment jig 100 with a predetermined position.

The smart loader 105 may include the transfer gripper 110 for gripping the hinge 102, and the transfer gripper 110 may include the articulated arm 220 disposed at an end portion thereof.

The FT (force and torque) sensor 107 may be disposed at a connection portion between the transfer gripper 110 and the articulated arm 220, and may sense a direction of a force applied to the transfer gripper 110 or the hinge 102 in an operational standby state.

The driving portion 130 may provide driving torque to the articulated arm 220 and the transfer gripper 110 for operations thereof through a motor, a decelerator, and a cylinder, and the controller 120 may control an operation of the driving portion 130. Further, the controller 120 may control the articulated arm 220 along the direction of the force sensed by the FT sensor 107 in the operational standby state of the articulated arm 220 and the transfer gripper 110 and then may correct a position of the transfer gripper 110.

In an exemplary embodiment of the present disclosure, the controller 120 may stop operations of the articulated arm 220 and the transfer gripper 110 depending on a signal sensed by the proximity sensor 109.

The control unit 120 may be implemented by one or more processors operated by a predetermined program, and the predetermined program may include a series of commands for performing a method according to an exemplary embodiment of the present disclosure described below.

Figure 2:
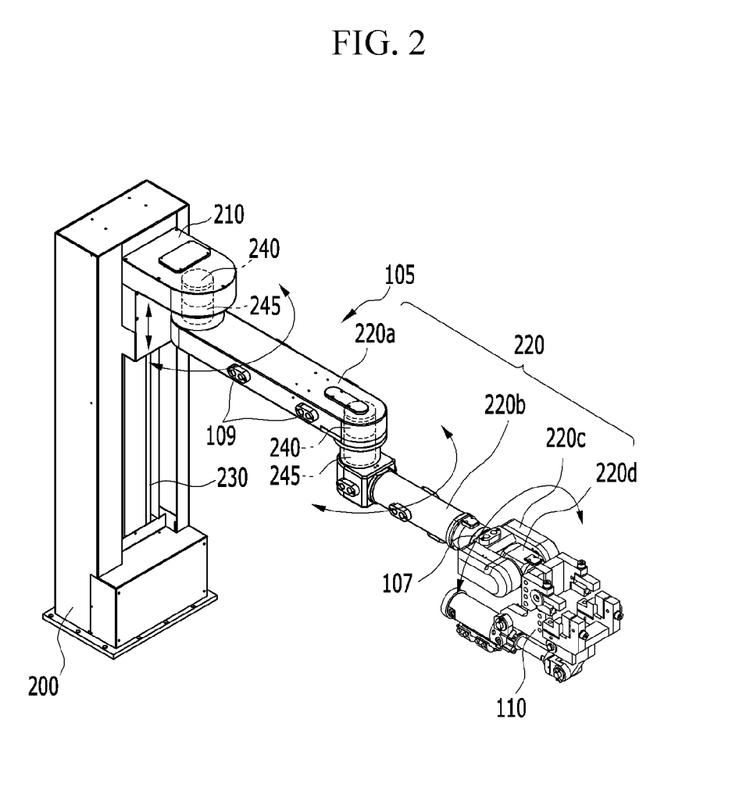
FIG. 2 illustrates a perspective view of a smart loader apparatus for a trunk lid hinge according to an exemplary embodiment of the present disclosure.

FIG. 2 illustrates a perspective view of a smart loader apparatus for a trunk lid hinge according to an exemplary embodiment of the present disclosure.

Referring to FIG. 2, the smart loader 105 may include a fixed body 200, a rail 230, a vertically moving member 210, the articulated arm 220, the FT sensor 107, the proximity sensor 109, the transfer gripper 110, a motor 240 and a decelerator 245.

The fixed body 200 may be fixed to a floor, the rail 230 may be vertically disposed at the fixed body 200, and the vertically moving member 210 may be disposed to vertically move along the rail 230.

One end of the articulated arm 220 may be connected to the vertically moving member 210, and the transfer gripper 110 may be mounted on another end of the articulated arm 220.

The articulated arm 220 may include a first arm 220a, a second arm 220b, a third arm 220c, and a fourth arm 220d. The first, second, third, and fourth arms 220a, 220b, 220c, and 220d may be connected to each other through joints, and the motor 240 and the decelerator 245, which may be elements of the driving portion 130, may be disposed at each joint to supply an operational power for the articulated arm 220.

The FT sensor 107 may be disposed at a connection portion between the articulated arm 220 and the transfer gripper 110, and the FT sensor 107 may sense the force direction applied to the transfer gripper 110 or the hinge 102 in the operational standby state of the articulated arm 220 and the transfer gripper 110 and then transmit the sensed force direction to the controller 120.

The controller 120 may control the motor 240 of the articulated arm 220 in the force direction sensed by the FT sensor 107 to be able to correct a position of the transfer gripper 110.

In addition, the proximity sensor 109 may be disposed at a predetermined position of the articulated arm 220, the proximity sensor 109 may sense an object or a worker within a predetermined distance and then transmit the sensed signal to the controller 120, such that the controller 120 may stop operations of the articulated arm 220 and the transfer gripper 110 depending on the sensed signal transmitted from the proximity sensor 109.

Figure 3:
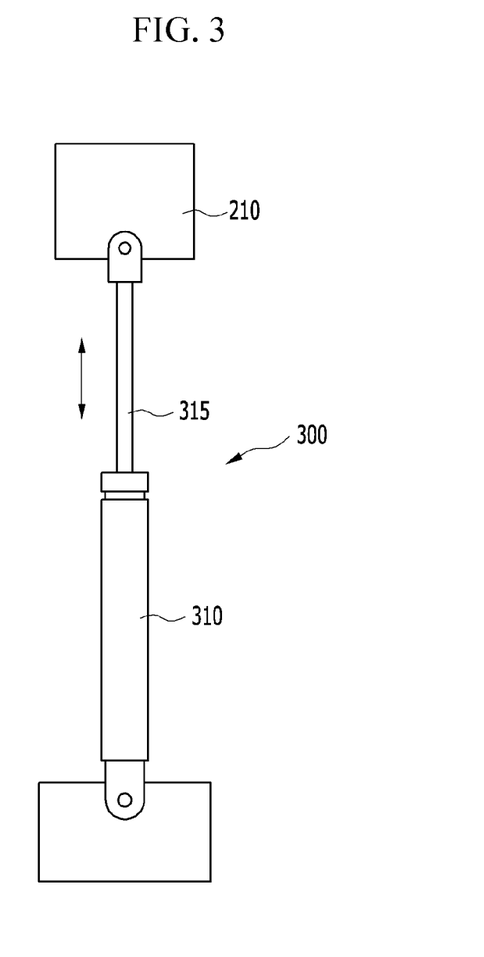
FIG. 3 schematically illustrates a front view of a gas spring according to an exemplary embodiment of the present disclosure.

Referring to FIG. 3, a gas spring 300 may include a gas cylinder 310 and a rod 315, and a upper end portion of the rod 315 may be connected to the vertically moving member 210.

A gas of a predetermined pressure may be filled inside the gas cylinder 310, a lower portion of the rod 315 may be inserted into the gas cylinder 310, and an upper portion thereof upwardly may pushe the vertically moving member 210.

Accordingly, the gas spring 300 entirely and upwardly may support the vertically moving member 210, the articulated arm 220, and the transfer gripper 110 to compensate for loads applied thereto.

Figure 4:
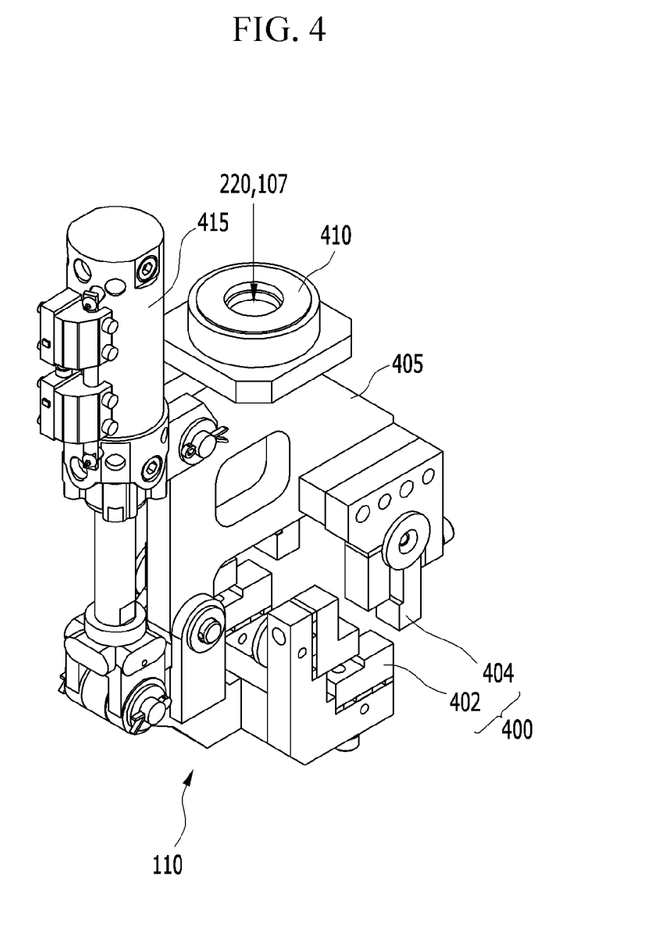
FIG. 4 illustrates a perspective view of a transfer gripper mounted on a smart loader apparatus for a trunk lid hinge according to an exemplary embodiment of the present disclosure.

Referring to FIG. 4, the transfer gripper 110 may include a mounting member 410, a gripper body 405, a finger 400 and a gripper cylinder 415. In FIG. 4, the mounting member 410 may be disposed at an upper side of the gripper body 405, and the gripper body 405 may be fixed to a front end portion of the articulated arm 220 through the mounting member 410.

The fixed finger 404 may be fixedly disposed at a right lower portion of the gripper body 405, the driving finger 402 may be disposed to be rotatable based on the hinge at a left lower portion, and the gripper cylinder 415 may be disposed at the gripper body 405 to push or pull one side of the driving finger 402, such that the driving finger 402 may grip the hinge 102 together with the fixed finger 404.

Figure 5:
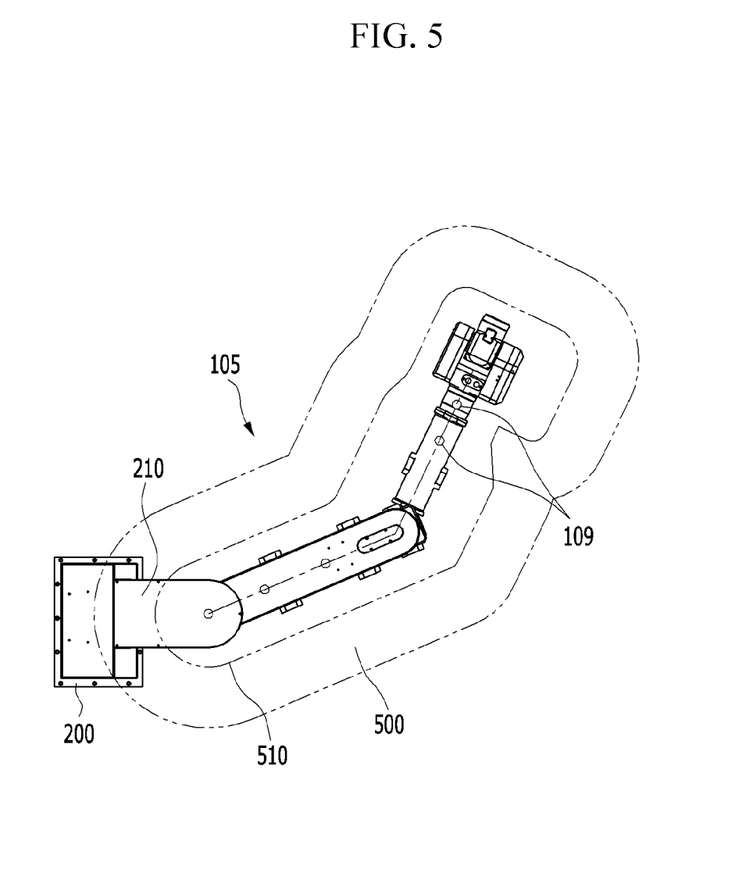
FIG. 5 schematically illustrates a top plan view of a smart loader apparatus for a trunk lid hinge according to an exemplary embodiment of the present disclosure.

Referring to FIG. 5, the proximity sensors 109 may be disposed at a predetermined position of the articulated arm 220, and the respective proximity sensor 109 may be set to be disposed to sense an object within a predetermined region.

A first region 500 and a second region 510 may be included in the region sensed by the proximity sensor 109, and when it is determined that an object is sensed within the first region 500, the controller 120 may generate an alarm signal, while when it is determined that an object is sensed within the second region 510, the controller 120 may stop the operations of the articulated arm 220 and the transfer gripper 110.

Figure 6:
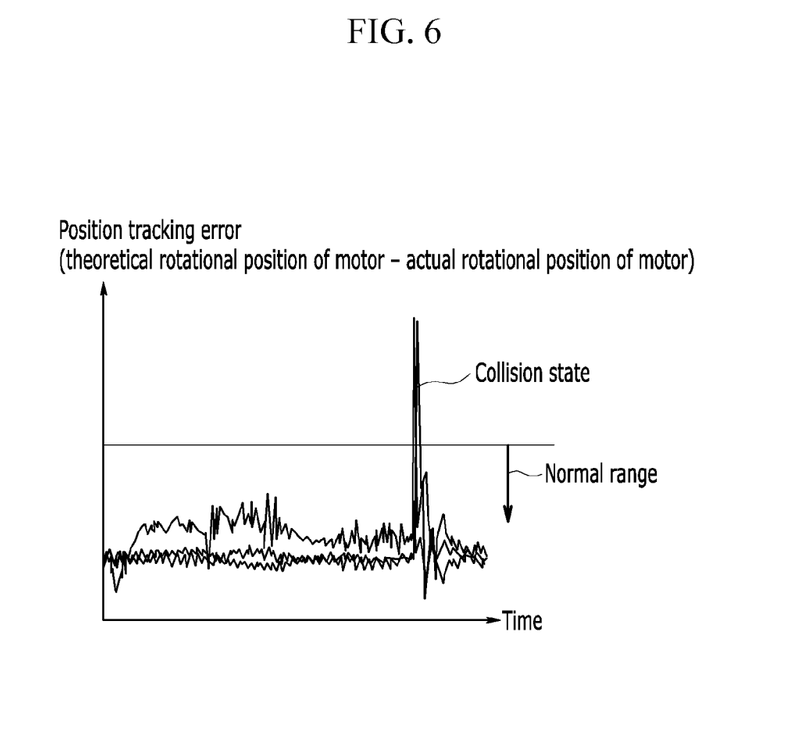
FIG. 6 illustrates a graph of a method of determining a collision state according to an exemplary embodiment of the present disclosure.

FIG. 6 illustrates a graph of a method of determining a collision state according to an exemplary embodiment of the present disclosure.

Referring to FIG. 6, a horizontal axis represents time, and a vertical axis represents error values between theoretical rotational positions of the motor and actual rotational positions thereof. The theoretical rotational positions may be calculated based on commands applied to the motor 240 by the controller 120, and the actual rotational positions may be sensed by a rotational position detecting sensor (not shown).

As shown in FIG. 6, when it is determined that the error value exceeds a normal range, the controller 120 may determine a collision state, then thereby stop the operations of the articulated arm 220 and the transfer gripper 110.

Figure 7:
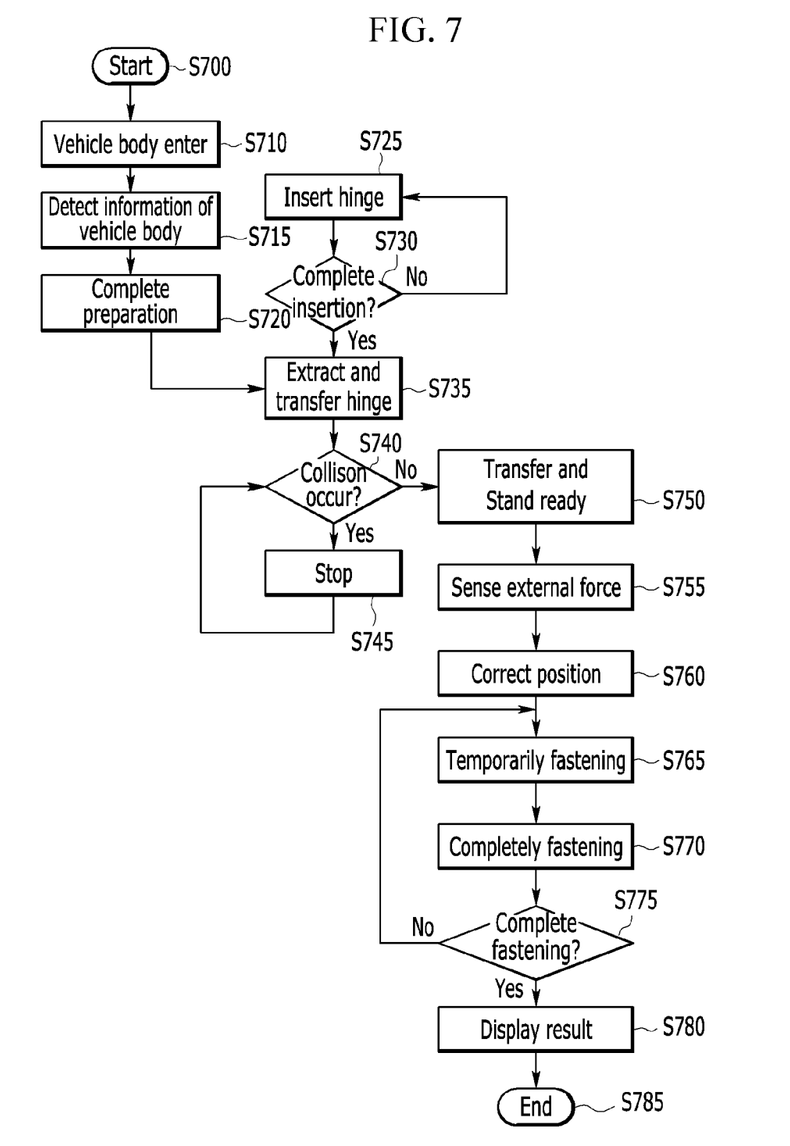
FIG. 7 illustrates a flowchart of a control method of a smart loader apparatus for a trunk lid hinge according to an exemplary embodiment of the present disclosure.

FIG. 7 illustrates a flowchart of a control method of a smart loader apparatus for a trunk lid hinge according to an exemplary embodiment of the present disclosure. As the flowchart is illustrated so as to be capable of easily understanding the present disclosure, respective steps may be exchanged with each other, or eliminated, and contents therefor selectively include the contents described above or may include different contents.

Referring to FIG. 7, a control starts at step S700, and the vehicle body 115 may enter a predetermined position at step S710. Information about the vehicle body 115 may be sensed at step S715.

When it is determined that a preparation is complete at step S720, a worker may insert and dispose the trunk lid hinge 102 into and at the hinge alignment jig 100 depending on the information about the vehicle body 115 at step S725.

When it is determined that the insertion and the alignment of the hinge 102 is complete at step S730, step S735 may be performed. At step S735, the transfer gripper 110 may move by the articulated arm 220 such that one of the hinges 102 arranged at the hinge alignment jig 100 may be transferred to a predetermined position of the vehicle body 115. While the entire control is performed, if an external object is sensed by the proximity sensor 109, the operations of the articulated arm 220 and the transfer gripper 110 may be stopped.

When it is determined that a collision occurrence is sensed while the hinge 102 is transferred at step S740, the operation of the articulated arm 220 may stop such that the transfer of the hinge 102 stops.

When no collision occurs or is sensed, or when a restart button (not shown) is operated after a collision, step S750 may be performed, such that the hinge 102 may be transferred to a predetermined position and then the operations of the articulated arm 220 and the transfer gripper 110 stand ready.

The direction of the force applied to the transfer gripper 110 or the hinge 102 may be sensed through the FT sensor 107 at step S755, and the transfer gripper 110 may be minutely transferred in the direction of the force sensed by the FT sensor 107 such that the position of the hinge 102 fixed to the transfer gripper 110 is accurately corrected at step S760.

The worker may temporarily fasten the hinge 102 to the vehicle body at step S765, and the transfer gripper 110 may be separated from the hinge 102 and then may return to the initial position at step S770.

The worker may completely fasten the hinge 102 to the vehicle body 115 at step S770, and it may be determined whether the hinge 102 is completely fastened to the vehicle body 115 at step S775. In this case, whether the hinge 102 is completely fastened to the vehicle body 115 may be determined by an operation of a fastening completion button.

Finally, a state in which the hinge 102 is completely fastened may be displayed at step S780, and one control cycle may be finished at step S785 and then step S700 may again be performed.

Figure 8:
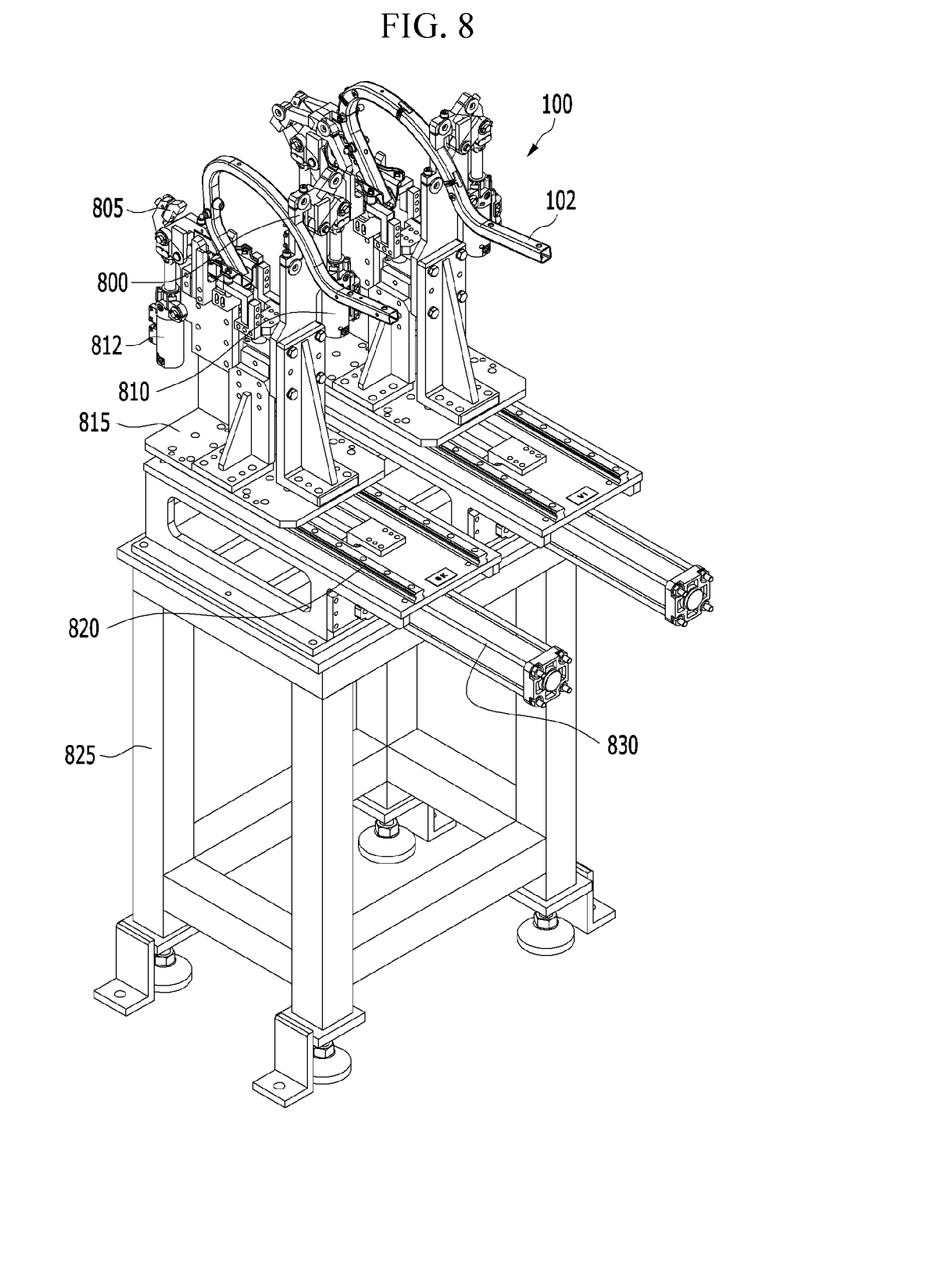
FIG. 8 illustrates a perspective view of a hinge alignment jig according to an exemplary embodiment of the present disclosure.

FIG. 8 illustrates a perspective view of a hinge alignment jig according to an exemplary embodiment of the present disclosure.

Referring to FIG. 8, the hinge alignment jig 100 may includes a fixed frame 825, a linear guide 820, a third alignment cylinder 830, a moving frame 815, a first alignment cylinder 810, a second alignment cylinder 812, a first hinge gripper 800, a second hinge gripper 805 and the hinge 102.

The moving frame 815 may be movably disposed on the fixed frame 825 along the linear guide 820, the first hinge gripper 800 and the second hinge gripper 805 may be disposed on the moving frame 815, the first hinge gripper 800 may be disposed to grip a central portion of the hinge 102, and the second hinge gripper 805 may be disposed to grip one end portion of the hinge 102.

The first alignment cylinder 810 may be disposed to operate the first hinge gripper 800, the second alignment cylinder 812 may be disposed to operate the second hinge gripper 805, and the third alignment cylinder 830 may be disposed to move the moving frame 815 along the linear guide 820.

While this disclosure has been described in connection with what is presently considered to be practical exemplary embodiments, it is to be understood that the disclosure is not limited to the disclosed embodiments. On the contrary, this disclosure is intended to cover various modifications and equivalent arrangements included within the spirit and scope of the appended claims.

What is claimed is:

1. A smart loader apparatus for a trunk lid hinge, comprising:
a hinge alignment jig at which a trunk lid hinge is aligned and disposed at a predetermined position;
a smart loader of which a transfer gripper for gripping the trunk lid hinge aligned at the hinge alignment jig is disposed at a front end portion, and the smart loader includes an articulated arm for transferring the trunk lid hinge gripped by the transfer gripper to a predetermined position of a vehicle body;
a driving portion that drives the transfer gripper and the articulated arm to change a position of the transfer gripper and allows the transfer gripper to grip or release the trunk lid hinge;
a force and torque (FT) sensor installed at a portion at which the articulated arm and the transfer gripper are connected for sensing a direction of a force applied to the transfer gripper or the trunk lid hinge in an operational standby state of the articulated arm and the transfer gripper; and
a controller that controls the driving portion to move the transfer gripper in the direction of the force sensed by the FT sensor,
wherein the smart loader includes:
a fixed body fixed on a floor;
a vertically moving member disposed to be vertically movable along a rail from one side of the fixed body; and
a gas spring that elastically upwardly supports the vertically moving member through a rod inserted into a gas cylinder in which a gas is filled at a predetermined pressure,
wherein the transfer gripper is rotatably disposed at one end of the articulated arm, and another end of the articulated arm is rotatably disposed at the vertically moving member.

2. The smart loader apparatus for the trunk lid hinge of claim 1, wherein the hinge alignment jig includes:
a moving frame disposed on a fixed frame to be movable along a guide;
a first alignment gripper disposed on the moving frame to grip one side of the trunk lid hinge and a second alignment gripper disposed to grip another side of the trunk lid hinge; and
a first cylinder for operating the first alignment gripper, a second cylinder for operating the second alignment gripper and a third cylinder disposed to move the moving frame along the guide on the fixed frame.

3. The smart loader apparatus for the trunk lid hinge of claim 1, further comprising:
a proximity sensor disposed at one side of the articulated arm of the smart loader to sense an object within a predetermined distance region,
wherein the controller controls the driving portion and stops an operation of the driving portion depending on a signal sensed by the proximity sensor.

4. The smart loader apparatus for the trunk lid hinge of claim 1, wherein the controller controls the driving portion in the direction of the force sensed by the FT sensor to correct a position of the transfer gripper through the articulated arm.

5. The smart loader apparatus for the trunk lid hinge of claim 1, wherein the transfer gripper includes:
a gripper body fixed to a front end portion of the articulated arm;
a fixed finger fixed to one side of the gripper body; and
a driving finger combined with the other side of the gripper body through a hinge,
wherein the driving portion includes a gripper cylinder that rotates the driving finger based on the trunk lid hinge on the gripper body such that the fixed finger and the driving finger grip the trunk lid hinge.

6. The smart loader apparatus for the trunk lid hinge of claim 3, wherein a plurality of proximity sensors is arranged at a predetermined interval in a length direction of the articulated arm to sense an object or a worker within a predetermined distance.

7. The smart loader apparatus for the trunk lid hinge of claim 1, wherein the driving portion includes a motor that outputs torque to control a position of the articulated arm, the controller calculates a difference between an actual rotational position and a theoretical rotational position of the motor and determines whether a collision has occurred depending on a magnitude of the difference, and when it is determined that the collision has occurred, the controller stops an operation of the driving portion to stop a movement of the articulated arm.

8. The smart loader apparatus for the trunk lid hinge of claim 1, wherein the articulated arm includes:

a first arm connected to the vertically moving member and disposed in a horizontal direction to be rotatable in the horizontal direction; and a second arm connected to the first arm and disposed in a horizontal direction to be rotatable in the horizontal direction based on the first arm, wherein the motor and a decelerator are disposed at a portion at which the vertically moving member and the first arm are connected and at a portion at which the first arm and the second arm are connected, and rotational positions of the first and second arms are changed by the motor and the decelerator.

9. A control method of a smart loader apparatus, comprising:

aligning a trunk lid hinge to be assembled at a vehicle body on a hinge alignment jig;

gripping the trunk lid hinge aligned at the hinge alignment jig with a transfer gripper disposed at an end portion of an articulated arm and transferring the trunk lid hinge to a predetermined position of the vehicle body;

sensing a direction of a force applied to the transfer gripper or the trunk lid hinge in an operational standby state of the articulated arm and the transfer gripper with a force and torque (FT) sensor installed between the articulated arm and the transfer gripper; and correcting a position of the transfer gripper in the direction of the force sensed by the FT sensor, wherein the smart loader includes:

a fixed body fixed on a floor;

a vertically moving member vertically movable along a rail from one side of the fixed body; and a gas spring that elastically upwardly supports the vertically moving member through a rod inserted into a gas cylinder in which a gas is filled at a predetermined pressure, wherein the transfer gripper is rotatably disposed at one end of the articulated arm, and another end of the articulated arm is rotatably disposed at the vertically moving member.

10. The control method of the smart loader apparatus of claim 9, further comprising aligning a position of the trunk lid hinge disposed at the hinge alignment jig with an alignment gripper that grips the trunk lid hinge disposed at the hinge alignment jig and a cylinder moving the alignment gripper.

11. The control method of the smart loader apparatus of claim 9, further comprising:

sensing an object or a worker with a proximity sensor disposed at a predetermined position relative to the articulated arm of the smart loader; and stopping operations of the articulated arm and the transfer gripper when the object or the worker is sensed.

12. The control method of the smart loader apparatus of claim 9, wherein a motor outputting torque for driving the articulated arm is included, and the control method further comprises:

calculating a difference between an actual rotational position and a theoretical rotational position of the motor;

determining whether a collision has occurred depending on a magnitude of the difference; and stopping a movement of the articulated arm when it is determined that a collision has occurred.

* * * * *